United States Patent
Stern-Berkowitz et al.

(10) Patent No.: US 7,848,782 B2
(45) Date of Patent: Dec. 7, 2010

(54) METHOD AND APPARATUS FOR IMPROVING NETWORK RESOURCE PLANNING IN A WIRELESS COMMUNICATION NETWORK

(75) Inventors: Janet Stern-Berkowitz, Little Neck, NY (US); Charles Dennean, Melville, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1407 days.

(21) Appl. No.: 11/289,940

(22) Filed: Nov. 30, 2005

(65) Prior Publication Data
US 2006/0172707 A1 Aug. 3, 2006

Related U.S. Application Data

(60) Provisional application No. 60/649,453, filed on Feb. 2, 2005.

(51) Int. Cl.
*H04M 1/00* (2006.01)
*H04B 1/38* (2006.01)

(52) U.S. Cl. ................. 455/561; 455/423; 455/424; 455/67.11; 455/67.13; 455/67.14; 455/67.15; 455/67.16; 455/67.7; 455/68; 455/69; 455/522

(58) Field of Classification Search ......... 455/423–425, 455/67.11, 67.13–67.16, 67.7, 68–69, 522, 455/561
See application file for complete search history.

(56) References Cited

U.S. PATENT DOCUMENTS

| | | | | |
|---|---|---|---|---|
| 5,805,666 | A * | 9/1998 | Ishizuka et al. | 379/1.01 |
| 6,088,588 | A * | 7/2000 | Osborne | 455/425 |
| 6,141,565 | A * | 10/2000 | Feuerstein et al. | 455/560 |
| 6,167,031 | A | 12/2000 | Olofsson et al. | |
| 6,308,071 | B1 * | 10/2001 | Kalev | 455/446 |
| 6,567,375 | B2 | 5/2003 | Balachandran et al. | |
| 6,810,236 | B2 | 10/2004 | Terry et al. | |
| 7,092,672 | B1 * | 8/2006 | Pekonen et al. | 455/67.11 |
| 7,286,854 | B2 * | 10/2007 | Ferrato et al. | 455/562.1 |
| 7,583,975 | B2 * | 9/2009 | Stephens et al. | 455/522 |
| 7,596,090 | B2 * | 9/2009 | Black | 370/234 |

FOREIGN PATENT DOCUMENTS

| KR | 100329646 | 3/2002 |
|---|---|---|
| TW | 564651 | 12/2003 |

* cited by examiner

*Primary Examiner*—Tuan A Tran
(74) *Attorney, Agent, or Firm*—Volpe and Koenig, PC

(57) ABSTRACT

Prior to being admitted into the network, a base station establishes a set of operating parameters. Next, a search is performed to determine the presence and configuration of neighboring base stations and current network conditions. Based on the search results, an improved operating configuration is determined for the base station and the base station's operating parameters are adjusted. Once the base station is admitted to and is operating in the network, the base station continues to monitor neighboring base stations and network conditions and adjusts its operating parameters accordingly.

42 Claims, 2 Drawing Sheets

METHOD AND APPARATUS FOR IMPROVING NETWORK RESOURCE PLANNING IN A WIRELESS COMMUNICATION NETWORK

CROSS REFERENCE TO RELATED APPLICATION

This application claims the benefit of U.S. Provisional Application No. 60/649,453 filed on Feb. 2, 2005, which is incorporated by reference as if fully set forth.

FIELD OF INVENTION

The present invention relates to wireless networks. More particularly, the present invention relates to improving network resource utilization and decreasing network interference in wireless communication networks.

BACKGROUND

In conventional wireless communication systems, only wireless transmit/receive units (WTRUs) are mobile. Base stations are typically fixed in position making their geographic location known. As a result, cell planning in conventional systems is primarily a task of ensuring that no two base stations are located in the same general area, operating on the same frequency, or are assigned identical network resources. To illustrate, network planning in a Wideband Code Division Multiple Access (WCDMA) Frequency Division Duplex (FDD) system includes assigning different primary scrambling codes to the various base stations operating near each other within that WCDMA FDD system. In addition, inter-cell interference is managed by setting a Common Pilot Channel (CPICH) power for each base station based on the relative distance between neighboring base stations.

In an advanced communication system, where base stations can be mobile, any a priori cell planning may become invalid due to the changing location of one or more base stations and/or changing network conditions. Mobility may include, for instance, simply relocating a base station from one fixed location to another, which may require removing a base station from the network at one location and then readmitting it at a new location. Mobility may also include movement of an active base station from one location to another, while the active base station is transmitting and/or receiving communication signals. Mobility may also include the constant movement of an active mobile base station through out the network. Currently, there does not exist an effective method and/or apparatus for use in network planning in networks having at least one mobile base station.

Accordingly, it is desirable to have a method and apparatus for improving network planning in wireless communication systems having at least one mobile base station.

SUMMARY

The present invention relates to a method and apparatus for improving resource utilization in a wireless communication network. Prior to being admitted into the network, a base station establishes a set of operating parameters. Next, a search is performed to determine the presence and configuration of neighboring base stations and to determine current network conditions. Based on the search results, an improved operating configuration is determined for the base station and the base station's operating parameters are adjusted accordingly. Once the base station is admitted to and is operating in the network, the base station continues to monitor neighboring base stations and network conditions and adjusts its operating parameters accordingly.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The present invention relates to a method and apparatus for use in improving, and preferably optimizing, resource allocation and reducing network interference in wireless communication systems. In a preferred embodiment, searches are utilized to identify existing network nodes (e.g., base stations) and to determine current network conditions. An improved operating configuration is then determined and utilized to adjust the particular operating parameters of a base station desiring admission and/or continued operation in the network. Once the base station is successfully admitted into the network, additional searches may be utilized to identify and maintain improved operating configurations. These additional searches may be controlled by an external operator or other mechanism, or automatically by the base station itself. If at any point it is determined that additional searches are no longer required, the searches are disabled and the base station continues to operate with its existing parameters without regard to network conditions.

As used herein, "improved operating configuration" refers generally to base station parameter settings that reduce inter-nodal interference and increase network resource utilization in view of current network conditions. It should be noted that changes in network conditions may occur as a result of any number of reasons, including mobility of network nodes within the network. Accordingly, the present invention is designed for use by both fixed and mobile base stations desiring to enter and/or continue operating in an existing wireless communication network.

Although the various embodiments of the present invention are described with reference to wideband code division multiple access (WCDMA)-type systems, it should be understood that the present invention is applicable for use in CDMA 2000, GSM (Global System for Mobile communications), WCDMA FDD (frequency division duplex), WCDMA TDD (time division duplex), and any other type of wireless communication system.

Figure 1:
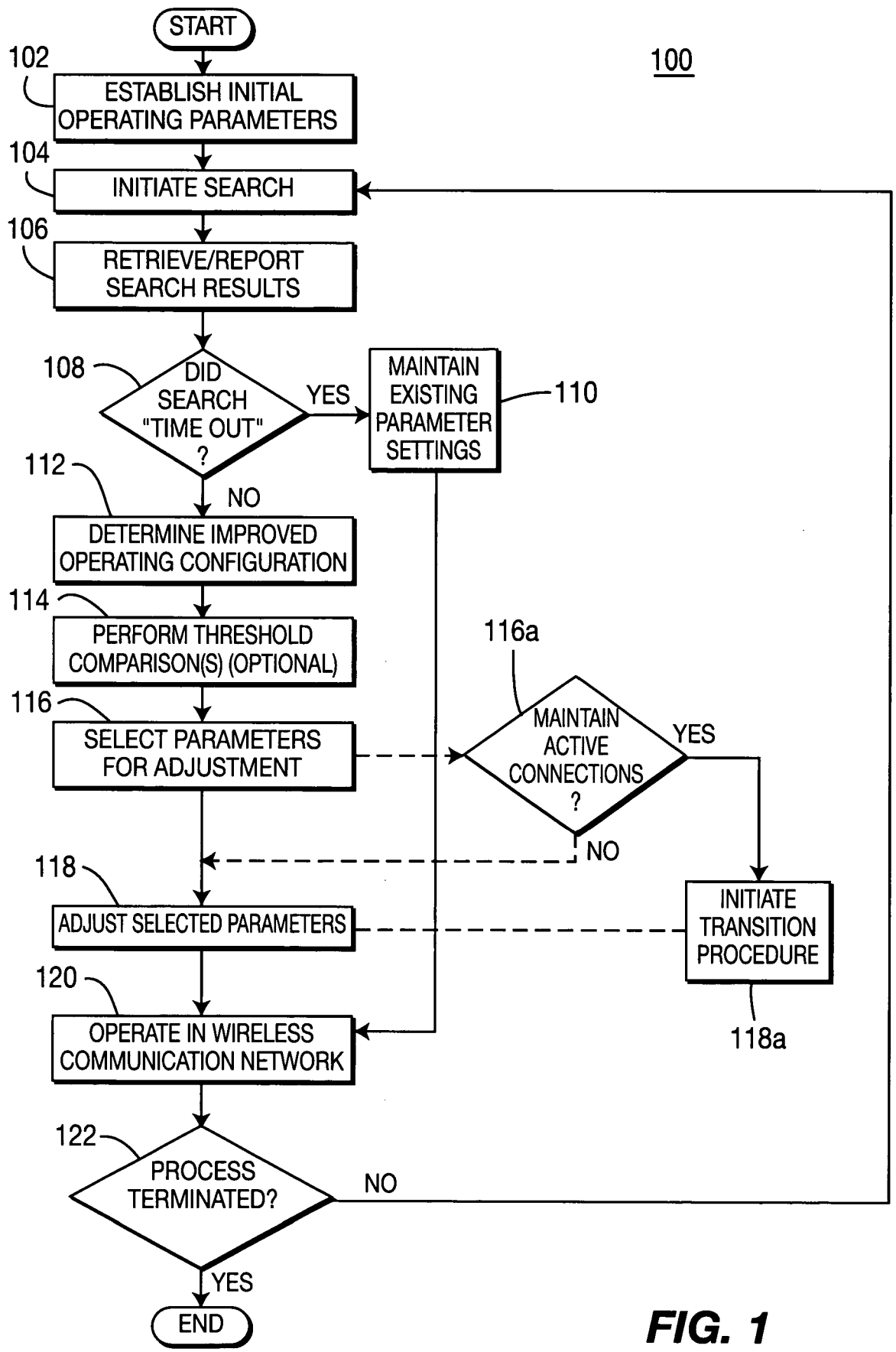
FIG. 1 is a flow diagram of a resource planning method in accordance with the present invention.

Referring now to FIG. 1, a flow diagram of a preferred network resource planning process 100 in accordance with the present invention is shown. Prior to being admitted into an existing wireless communication network, a base station establishes an initial set of operating parameters (step 102). These operating parameters may include power settings, operating frequency(s), permissible parameter adjustment(s), and the like. Also, included in the operating parameters are search parameters for use in determining current network conditions. Examples of search parameters may include a frequency range across which to scan, predefined resource parameters of nodes expected in the network, etc. Optionally, the operating parameters may include a set of comparison thresholds. As further discussed below, these comparison thresholds may be utilized in determining whether to adjust or to maintain particular parameter settings.

Any appropriate technique(s) for establishing the initial set of operating parameters may be utilized in accordance with the present invention. To illustrate, the operating parameters may be pre-established and programmed and/or hard-coded into a base station. Alternatively, the initial set of operating parameters may be provided via an operation, administration and management (OA&M) system. In yet another example, a base station may establish its initial set of operating parameters by utilizing a previously established set of operating parameters, perhaps from a prior admission into the wireless communication network.

After the initial set of operating parameters is established (step 102), and prior to initiating any transmissions, the base station initiates a search (step 104) based on the previously established search parameters to determine current network conditions. This search (step 104) may include, for example, scanning across frequencies within a predefined range to identify minimal, moderate, and high interference operating frequencies. Optionally or additionally, the search (step 104) may include locating other base stations operating in the wireless network via their respective beacon channel transmissions and measuring the signal strength of these other base stations. To illustrate, in a WCDMA implementation, neighboring base stations may be identified via a modified version of the initial cell search procedure defined in the 3$^{rd}$ Generation Partnership Project (3GPP) standards. This search procedure utilizes measurements from synchronization channel (SCH) and common pilot channel (CPICH) transmissions to determine the transmission frequencies of these neighboring base stations and to identify any interference they may cause. As further described below, results of the search are utilized to determine an improved operating configuration for the base station (step 112) and if necessary, to adjust the parameter settings of the base station (step 118) accordingly.

In a preferred embodiment, the initial search (step 104), as well as any subsequent searches, are initiated and performed at the base station. To this end, the base station may include a dedicated processing unit configured to perform this searching function (step 104). Alternatively, a co-located device may be utilized to scan the network (step 104) and report the search results (step 106) back to the base station. In such an implementation, the co-located device may be a WTRU-like device dedicated to performing the prescribed searching and reporting functions. Standard and/or non-standard signaling, hardwired connections, and/or alternate wireless connections, for example, may be utilized by the co-located device to report search results (step 106) back to the base station.

It should be noted that the term "co-located", as used herein, describes a condition of being close enough to a base station to adequately perform the desired searching (step 104) and reporting (step 106) functions. Accordingly, a physical connection between the device and a base station is not required for co-location. In a mobile base station, for example, a "co-located" device may be a device located in any portion of an apparatus used to house the mobile base station (e.g., truck, van, etc.), such that the device remains close enough to the base station to adequately perform the desired searching and reporting functions.

In an alternate embodiment, the base station may utilize a plurality of WTRUs operating in the wireless communication network to scan the network (step 104) and to report the search results (step 106) back to the base station. In a WCDMA implementation, for example, standard WTRU reports of listed and unlisted neighbor cells may be used for this purpose.

Once the search is initiated (step 104), search results are expected within a predetermined time period. If it is determined that the search results have not been received/reported within this predetermined time period (step 108), i.e., if the search has "timed-out", the base station's existing parameter settings are maintained (step 110) and the base station begins operating in the wireless communication network (step 120). If, however, the search results are received within the predetermined time period, the results are utilized to determine an improved operating configuration (step 112) for the base station. To illustrate, in a WCDMA implementation, the determination of an improved operating configuration (step 112) may include choosing a frequency found to have lower interference than the current operating frequency, and/or selecting a scrambling code that is not being used by a neighboring base station, etc. Further, if allowable parameter settings and/or configurations have been defined for the base station (step 102), the determined configuration (step 112) is selected to be consistent with an allowed parameter set.

Based on the determination of an improved operating configuration (step 112), any number of the base station's parameter settings are selected (step 116) and adjusted accordingly (step 118). Any required parameter adjustment(s) (step 118) may be performed manually via, for example, an operator who receives and reviews the search results; or automatically via, for example, a resource allocation algorithm configured to minimize the overall system interference.

Optionally or additionally, comparison thresholds may be utilized to determine whether a particular parameter may be adjusted, and if so, to what extent (step 114). If comparison thresholds were established (from step 102), adjustments to selected parameter(s) will only occur if the comparison(s) (from step 114) exceed the established threshold(s) (from step 102). Utilizing thresholds in this manner promotes base station stability by preventing excessive parameter changes. The comparison(s) to thresholds step (step 114) may include the parameters themselves and/or other appropriate criteria such as performance, interference reduction, etc. Each parameter that can be adjusted may have its own threshold criteria for determining if and to what extent the parameter may be modified. Alternatively, a particular parameter may use the same threshold criteria as one or more other parameters, or it may have no threshold requirement at all.

To illustrate, if the search (step 104) indicates that a base station's current operating frequency has a high level of interference, a different frequency indicating a lower interference level is selected. If a comparison threshold for interference has been established (from step 102), then the reduction in interference would need to exceed this threshold before the frequency were changed (step 114). Similarly, if the search results (step 104) indicate that another base station already exists having the same network resource(s) as those proposed for this base station, (e.g., a same scrambling code for a WCDMA FDD-type base station), different network resources (e.g., scrambling code) are selected for this base station and in this case, no threshold is used.

Once the selected parameters are adjusted (step 118) (if necessary), the base station begins operating within the wireless communication network (step 120). In order to maintain a preferred operating configuration, the network may continue to be monitored for changes in neighboring base stations, signal strength, traffic, etc. This monitoring is accomplished via performing the searching, comparing, and parameter adjustment functions (steps 104 through 118) utilized to admit the base station into the network. In the threshold comparison step (step 114), however, the comparison threshold(s) may be different than the initial comparison threshold(s) used prior to admission of the base station. Different comparison threshold(s) may also be used based on whether or not the base station is actively communicating with WTRUs.

The process 100 continues unless it is terminated (step 122) based on pre-determined criteria or via an external event, such as a manual termination by an operator monitoring the network. If terminated, the process 100 may be resumed in the same manner, that is, the process 100 may be resumed based on pre-determined criteria or via an external event.

If it is determined that the process 100 is not to be terminated (step 122), the process 100 returns to step 104 and a subsequent search is initiated and performed in any of the preferred manners described above. This subsequent search (step 104) may be limited to taking measurements on a single frequency, i.e., the frequency on which the base station is currently transmitting, or the search (step 104) may include scanning and taking measurements across multiple frequencies. In the single- or "intra-frequency" search scenario, as well as for measurements on the current transmission frequency if included in the multiple frequency case, available mechanisms for taking intra-frequency measurements without causing interference in the base station must be utilized. To illustrate, and purely by way of example, in a WCDMA FDD implementation, idle periods in the downlink (IPDL) as defined by the 3GPP standards may be utilized to avoid interference while taking intra-frequency measurements. According to IPDL, a WCDMA FDD base station is configured with periodic gaps during which the transmission of its down link channels is ceased. By scheduling intra-frequency measurements during these gaps, the base station avoids interference by its own downlink transmissions.

After the subsequent search is completed (step 104), the process 100 proceeds through to step 116, at which point parameters are selected for adjustment. Prior to making any adjustments (step 118), however, a determination is made (step 116a) concerning existing connections between the base station and other network devices. If the base station is actively communicating, (i.e., transmitting and/or receiving data), with at least one WTRU, changing or adjusting its transmission parameters will cause any such connection to be dropped. Thus, if it is determined (step 116a) that one or more connections should be maintained, the base station initiates a special procedure (step 118a) to transition to its adjusted parameters without dropping the desired connection(s). Determining whether an active connection should be maintained (step 116a) may be based on the importance of the connection, the number of active connections, whether the connection is an emergency-type connection, and/or any other relevant considerations.

This special transition procedure (step 118a) may include any appropriate technique available for the particular type of base stations/communication network involved. In a WCDMA FDD implementation, for example, a "self-handover" procedure may be initiated. Similar to conventional handover, WTRUs being serviced by the base station receive instructions to handover. However, rather than handing over to a new cell or base station, the WTRUs are instructed to handover to the base station's new operating configuration, (i.e., new frequency, new scrambling code, etc.).

It should be noted that if the base station is not actively communicating with another device, or if it is determined that all active connections may be dropped (step 116a), the base station may proceed and adjusts its transmission parameters (step 118) without initiating the special transition procedure (step 118a).

After the base station's parameters are adjusted (step 118) and/or the special transition procedure is completed (step 118a), the base station again continues to operate with its newly adjusted parameters (step 120). The process 100 is then repeated (steps 104-120) unless it is terminated (step 122) based on pre-determined criteria or via an external event, such as for example, a manual termination by an operator monitoring the network. Once terminated, the process 100 may be reinitiated based on pre-determined criteria or on an external event.

Figure 2:
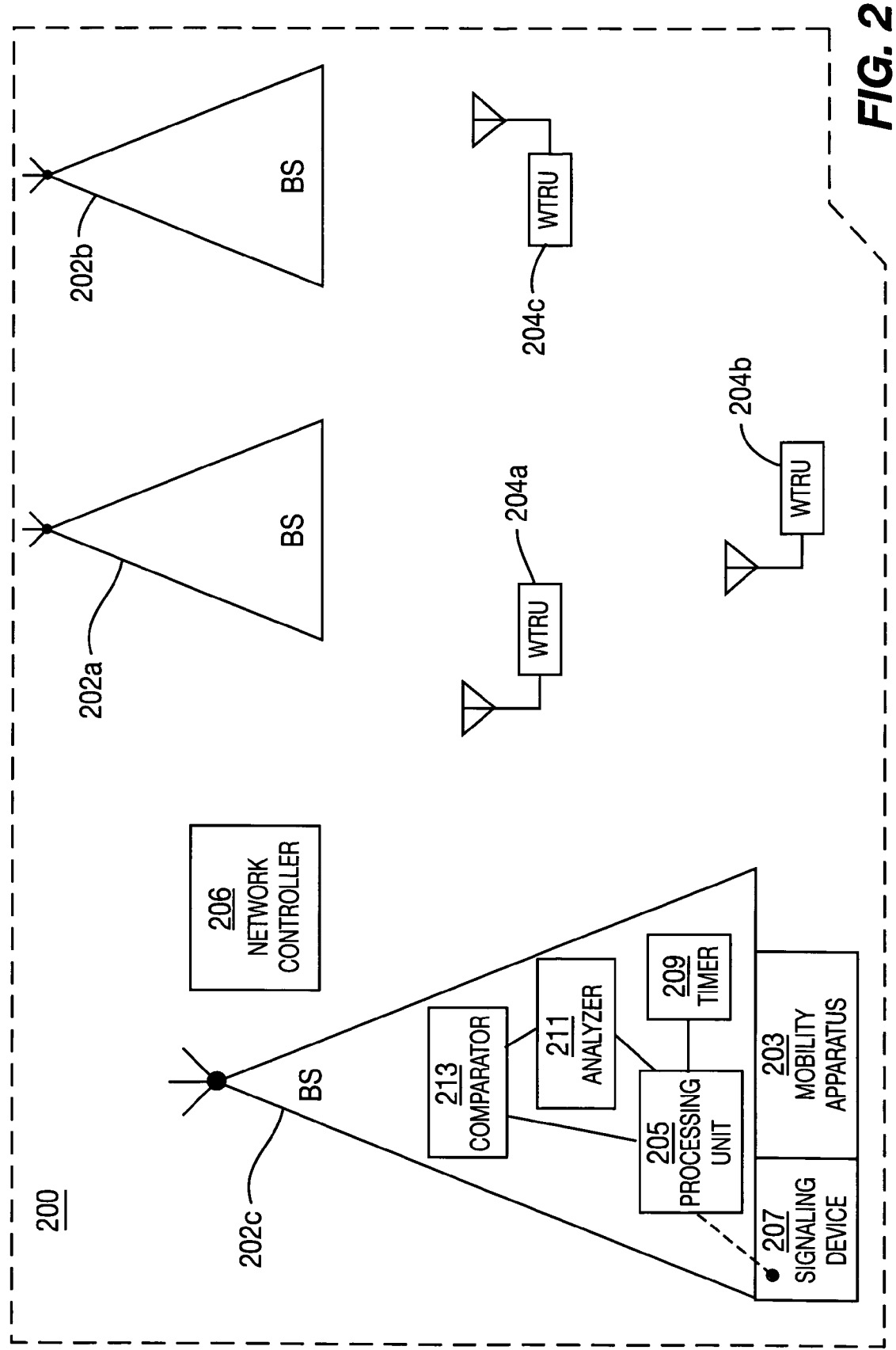
FIG. 2 is a base station configured to improve the use of network resources in accordance with the present invention.

Referring now to FIG. 2, a wireless communication system 200 configured to improve network resource use in accordance with the present invention is shown. The system 200 includes a plurality of base stations 202a, 202b, a plurality of WTRUs 204a, 204b, 204c, and a network controller 206. A third base station 202c is shown physically located within the boundaries of the communication system 200. This third base station 202c, however, is not yet admitted to operate within the system 200.

For purposes of the present illustration, the communication system 200 is a WCDMA wireless communication network and the base stations 202a, 202b, 202c, WTRUs 204a, 204b, 204c, and network controller 206 are WCDMA-FDD compatible. It should be noted, however, that the present system 200, including the base stations 202a, 202b, 202c, WTRUs 204a, 204b, 204c, and network controller 206, may be configured to operate in a WCDMA TDD, CDMA 2000, GSM, or any other type of wireless communication system.

The third base station 202c is configured to operate as either a static base station 202c or a mobile base station 202c. Accordingly, this base station 202c comprises a mobility apparatus 203 for use in navigating throughout the system 200. In addition, the static/mobile base station 202c comprises an optional processing unit 205 configured to initiate and/or perform searches; an optional co-located signaling device 207 configured to perform searches and report search results; an optional timer 209 configured to determine whether the search has exceeded a predetermined time limit; an optional analyzer 211 configured to determine an improved operating configuration for the base station 202c in view of search results; and an optional comparator 213 configured to compare appropriate criteria relating to a determined operating configuration with a set of one or more thresholds. In a preferred embodiment, the processing unit 205 is further configured to adjust the base station's 202c operating parameters.

In order to gain admission into the system 200, base station 202c first establishes an initial set of operating parameters. These operating parameters may include power settings, operating frequency(s), permissible parameter adjustment(s), and the like. Also included in the operating parameters are search parameters for use in locating and identifying other base stations 202a, 202b within the communication system 200. This initial set of operating parameters may be pre-established and programmed and/or hard-coded into the base station 202c, provided via an OA&M-type system, or a re-use of previously established operating parameters, perhaps from a prior admission into the present system 200.

After the initial operating parameters are established, the base station's 202c processing unit 205 initiates a search. A co-located signaling device 207, in response to the processing unit 205, performs the search which may include, for example, scanning the system 200 to identify frequencies with minimal, moderate, and high interference. Optionally or additionally, the search may include detecting and identifying neighboring base stations 202a, 202b currently operating within the system 200. Since the present communication system 200 is a WCDMA-type system, the neighboring base stations 202a, 202b may be identified via their respective SCH and CPICH transmissions. It should be noted that although the signaling device 207 is shown mounted to the mobility apparatus 203, this co-located device 207 may reside in any location proximate enough to the base station 202c to enable the device 207 to perform its desired searching and reporting functions. Standard and/or non-standard signaling, hardwired connections, and/or wireless connections may be utilized to communicate with and/or receive search results from the signaling device 207.

In an alternate embodiment, the processing unit 205 may be configured to both initiate and perform the search. In yet another embodiment, the base station 202c may utilize the plurality of WTRUs 204a, 204b, 204c to perform the search.

Once the processing unit 205 initiates the search, search results may be expected back at the base station 202c within a predetermined time period. If the timer 209 determines that the search results are not timely received, i.e., the search has "timed out", the base station 202c is admitted into the system 200 and begins operating with its existing parameter settings. If, however, the search results are timely received, the search results are sent to the analyzer 211, where they are utilized to determine an improved operating configuration. This determination is consistent with a permissible set of parameter settings/configurations if such a set was initially provided.

The determined operating configuration is then sent to the comparator 213. The comparator 213 identifies those parameters that should be adjusted. Optionally, the comparator 213 may utilize predefined comparison thresholds to determine whether a particular parameter may be adjusted and if so, to what extent. If comparison thresholds are utilized, appropriate criteria of the determined configuration, such as performance improvement and/or interference reduction, are compared with the predefined threshold(s). Adjustments to selected parameter(s) will only occur if the comparison(s) exceed the established threshold(s). Utilizing thresholds in this manner promotes base station stability by preventing excessive parameter changes.

Parameters identified for adjustment/modification, are then adjusted by the processing unit 205. In an alternate embodiment, the search results and/or the identified parameters may be reported to an external operator (not shown) and adjusted manually. In yet another embodiment, parameters may be adjusted automatically via, for example, a resource allocation algorithm (not shown) configured to improve the overall system performance.

After the identified parameters are adjusted (if necessary), the base station 202c is admitted into the system 200 and begins operating with its newly adjusted operating parameters. In order to maintain a preferred configuration, the base station 202c may initiate a monitoring process to identify changes in network conditions and/or neighboring base stations 202a, 202b, and to adjust its parameters accordingly. This monitoring process may be accomplished by repeating the searching, comparing, and adjustment functions utilized to gain admission into the system 200.

Subsequent searches, if initiated, may include scanning across multiple frequencies, or scanning a single frequency, i.e., the frequency on which the base station 202c is currently operating. In a single- or "intra-frequency" search scenario, IPDL, as defined by the 3GPP standards, may be utilized to avoid self-interference while taking intra-frequency measurements. Once a subsequent search is completed, the process continues until parameters are selected for adjustment (if needed). Prior to adjusting any parameters, however, a determination must be made regarding which, if any, active connections to the base station 202c should be maintained. This determination may be made via the processing unit 205, the network controller 206, and/or an external operator (not shown).

If it is determined that at least one active connection should be maintained, the base station 202c initiates a "self-handover" procedure. Similar to conventional handover procedures, WRTUs 204a, 204b, 204c actively communicating with the base station 202c receive instructions to handover. Rather than handing over to a new cell or base station, however, any WTRU 204a, 204b, 204c actively communicating with the base station 202c is instructed to handover to the base station's 202c new operating configuration. This manner of handover/parameter adjustment prevents important active connections from being unexpectedly terminated or dropped.

The base station 202c then continues to operate and monitor conditions in the wireless communication system 200 in the manner described above. The processing unit 205 may activate and/or deactivate the searches automatically based on pre-determined criteria. Alternatively, an operator or other external event (not shown) may manually initiate, interrupt, and/or disable searches.

The features of the present invention may be incorporated into an IC or be configured in a circuit comprising a multitude of interconnecting components. The features may be embodied in a hardware implementation, a software implementation, or a combined hardware/software implementation.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method of improving network resource utilization in a wireless communication network comprising:

establishing an initial set of operating parameters in at least one base station;

performing a search to determine current network conditions;

determining an improved operating configuration based on the current network conditions;

selecting at least one of the established operating parameters for adjustment; and adjusting the at least one established operating parameters in accordance with the determined improved configuration, wherein the method is performed upon admission of the at least one base station into a wireless communication network and prior to the at least one base station initiating a transmission.

2. The method of claim 1, further comprising selecting a new scrambling code if a search reveals that a current scrambling code is in use by another base station using the same transmission frequency.

3. The method of claim 1, wherein the initial set of operating parameters is pre-programmed in the at least one base station.

4. The method of claim 1, wherein the initial set of operating parameters is provided by an operation, administration and management (OA&M) system.

5. The method of claim 1, wherein the initial set of operating parameters is established by reusing a previously established set of operating parameters.

6. The method of claim 1, wherein the initial set of operating parameters includes permissible parameter settings and permissible configurations.

7. The method of claim 6, further comprising adjusting the at least one operating parameter to an extent permissible by the initial set of operating parameters.

8. The method of claim 1, wherein the initial set of operating parameters includes at least one comparison threshold.

9. The method of claim 8, further comprising adjusting the at least one selected operating parameter if a comparison criteria exceeds the at least one comparison threshold.

10. The method of claim 1, wherein the search comprises scanning frequencies within a predetermined frequency band to identify other base stations operating in the wireless communication network.

11. The method of claim 10, wherein the search is performed at the at least one base station.

12. The method of claim 10, wherein the search is performed by a co-located device.

13. The method of claim 10, wherein a plurality of wireless transmit/receive units (WTRUs) are utilized to perform the search.

14. The method of claim 10, further comprising requesting a search and performing the requested search at a network controller.

15. The method of claim 10, further comprising determining whether search results from the search are received within a predetermined period of time.

16. The method of claim 15, further comprising admitting the at least one base station into the wireless communication network if the search results are not received within the predetermined period of time, wherein the at least one base station operates using the initial set of operating parameters.

17. The method of claim 15, further comprising determining the improved operating configuration if the search results are received within the predetermined period of time.

18. The method of claim 17, further comprising adjusting the operating parameters via an external operator based on the operator's receipt and review of the search results.

19. The method of claim 17, further comprising adjusting the operating parameters automatically via a resource allocation algorithm configured to improve resource allocation in the wireless communication network.

20. The method of claim 17, further comprising admitting the at least one base station into the wireless communication network, wherein the at least one base station operates using the adjusted operating parameters.

21. A base station configured to improve resource utilization in a wireless communication network, the base station comprising:
a processing unit configured to initiate a search;
a signaling device configured to perform the search and report search results;
an analyzer configured to determine an improved operating configuration based on the search results;
a comparator configured to optionally compare criteria relating to the improved operating configuration with a set of one or more thresholds, and to identify at least one of a set of current operating parameters for adjustment; and wherein the processing unit is further configured to adjust the at least one current operating parameter in accordance with the determined improved configuration.

22. The base station of claim 21, wherein the processing unit is further configured to perform the search.

23. The base station of claim 21, wherein the set of current operating parameters includes permissible parameter settings and permissible configurations, the processing unit being configured to adjust the at least one parameter to a permissible extent.

24. The base station of claim 21, wherein the set of current operating parameters includes at least one comparison threshold, the processing unit being further configured to adjust the at least one identified operating parameter if the parameter's comparison criteria exceeds the threshold.

25. The base station of claim 21, wherein the base station is configured to provide search results to an external operator.

26. The base station of claim 21, wherein the base station is configured to provide the improved operating configuration to an external operator.

27. The base station of claim 21, wherein the base station is configured to accept parameter adjustment information from an external operator.

28. The base station of claim 21, further comprising a resource allocation algorithm, wherein the algorithm is configured to automatically adjust operating parameters.

29. The base station of claim 21, wherein the base station is configured to search frequencies within a predetermined frequency band to identify other base stations in the wireless communication network.

30. The base station of claim 21, further comprising a timer configured to determine whether the search results are received within a predetermined time limit.

31. The base station of claim 30, wherein the base station is further configured to begin or continue operating in the network with the set of current operating parameters if the search exceeds the predetermined time limit.

32. The base station of claim 30, wherein the analyzer is configured to determine the improved configuration if the search results are received within the predetermined time limit.

33. The base station of claim 21, wherein the processing unit is further configured to determine whether at least one active connection to the base station should be maintained.

34. The base station of claim 33, wherein the processing unit is further configured to initiate a transition procedure that prevents an active connection to the base station from being dropped during a parameter adjustment.

35. The base station of claim 34, wherein the transition procedure is a self-handover procedure.

36. The base station of claim 21, wherein the base station is further configured to initiate and terminate subsequent searches and parameter adjustments according to predetermined criteria.

37. The base station of claim 36, wherein the subsequent searches are limited to the base station's operating frequency.

38. The base station of claim 21, wherein the base station is configured to select a new scrambling code if a search reveals that a current scrambling code is in use by another base station using the same transmission frequency.

39. The base station of claim 21, wherein the base station is configured to make intra-frequency measurements without causing self-interference.

40. The base station of claim 39, wherein the base station is a wideband code division multiple access (WCDMA) base station and wherein the intra-frequency measurements are made during idle periods in downlink (IPDL).

41. The base station of claim 21, wherein the base station is mobile and further comprises a mobility apparatus.

42. The base station of claim 41, wherein the signaling device is located on the mobility apparatus and is configured to utilize any combination of standard signaling, non-standard signaling, hard-wired connections, and wireless connections to report search results to the analyzer.

\* \* \* \* \*